United States Patent
Choi et al.

(10) Patent No.: US 11,765,712 B2
(45) Date of Patent: Sep. 19, 2023

(54) METHOD AND APPARATUS FOR MULTI-USER SCHEDULING FOR MINIMIZE TRANSMISSION DELAY

(71) Applicant: Industry-Academic Cooperation Foundation, Chosun University, Gwangju (KR)

(72) Inventors: Wooyeol Choi, Gwangju (KR); Yonggang Kim, Suwon-si (KR)

(*) Notice: Subject to any disclaimer, the term of this patent is extended or adjusted under 35 U.S.C. 154(b) by 46 days.

(21) Appl. No.: 17/535,740

(22) Filed: Nov. 26, 2021

(65) Prior Publication Data
US 2023/0015633 A1   Jan. 19, 2023

(30) Foreign Application Priority Data
Jun. 30, 2021   (KR) .................. 10-2021-0085916

(51) Int. Cl.
*H04W 72/12*   (2023.01)
*H04W 72/121*   (2023.01)
*H04W 72/542*   (2023.01)

(52) U.S. Cl.
CPC ....... *H04W 72/121* (2013.01); *H04W 72/542* (2023.01)

(58) Field of Classification Search
CPC .......................... H04W 72/121; H04W 72/542
USPC ........................................................ 370/336
See application file for complete search history.

(56) References Cited

U.S. PATENT DOCUMENTS

| | | | |
|---|---|---|---|
| 2011/0002227 A1* | 1/2011 | Sampath ............ | H04W 72/121 370/329 |
| 2016/0255656 A1* | 9/2016 | Lou .................. | H04W 72/0453 370/335 |
| 2019/0200404 A1* | 6/2019 | Yu .................... | H04W 72/0446 |
| 2021/0029585 A1* | 1/2021 | Bharadwaj ......... | H04W 72/569 |

FOREIGN PATENT DOCUMENTS

KR   10-2014-0084171 A1   7/2014

OTHER PUBLICATIONS

Kim, Y.; Kim, G.; Oh, Y.; Choi, W. Transmission Delay-Based Uplink Multi-User Scheduling in IEEE 802.11ax Networks. Appl. Sci. 2021, 11, 9196. https://doi.org/10.3390/app11199196.

* cited by examiner

Primary Examiner — Gbemileke J Onamuti

(57) ABSTRACT

Disclosed is a method and an apparatus for multi-user scheduling for minimizing transmission delay. A method of multi-user scheduling for minimizing transmission delay according to an exemplary embodiment of the present invention includes: (a) clustering at least one station (STA) among a plurality of STAs to a terminal cluster based on transmission delay for each of the plurality of STAs; (b) transmitting a trigger frame including scheduling information about the terminal cluster including said at least one STA to said at least one STA; and (c) receiving uplink data from said at least one STA in response to the transmission of the trigger frame.

8 Claims, 16 Drawing Sheets

[FIG. 1A]
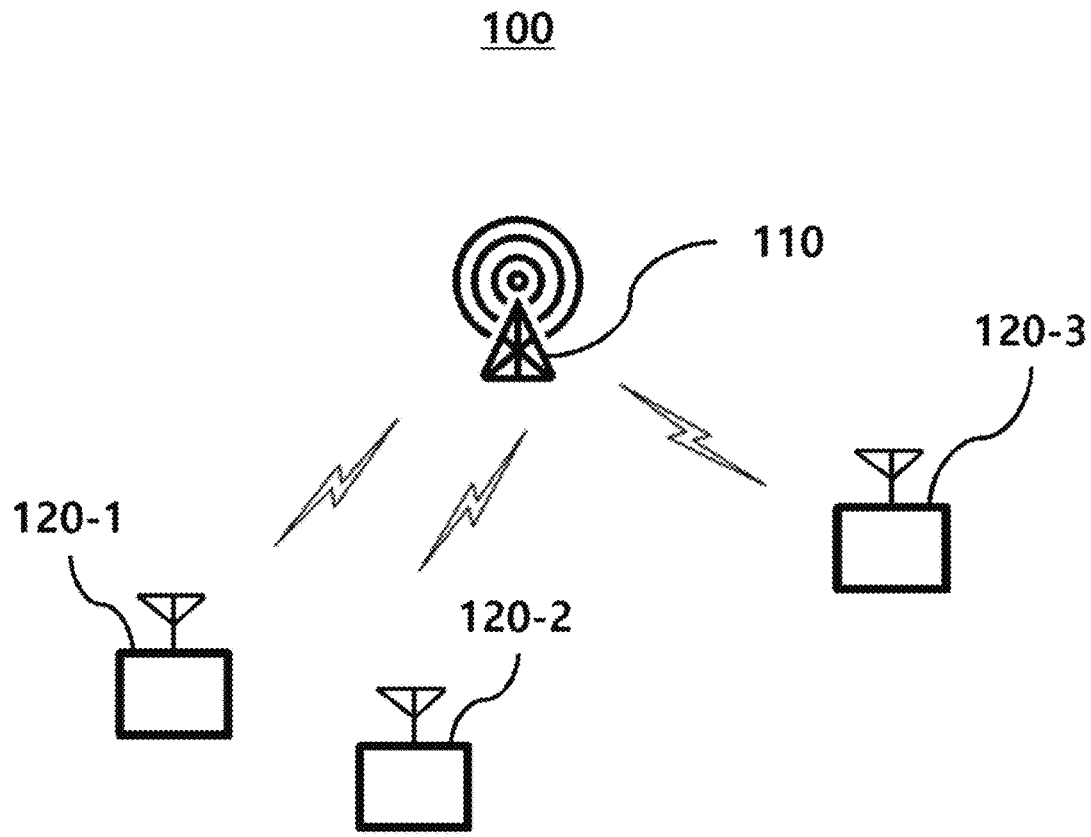
[FIG. 1B]
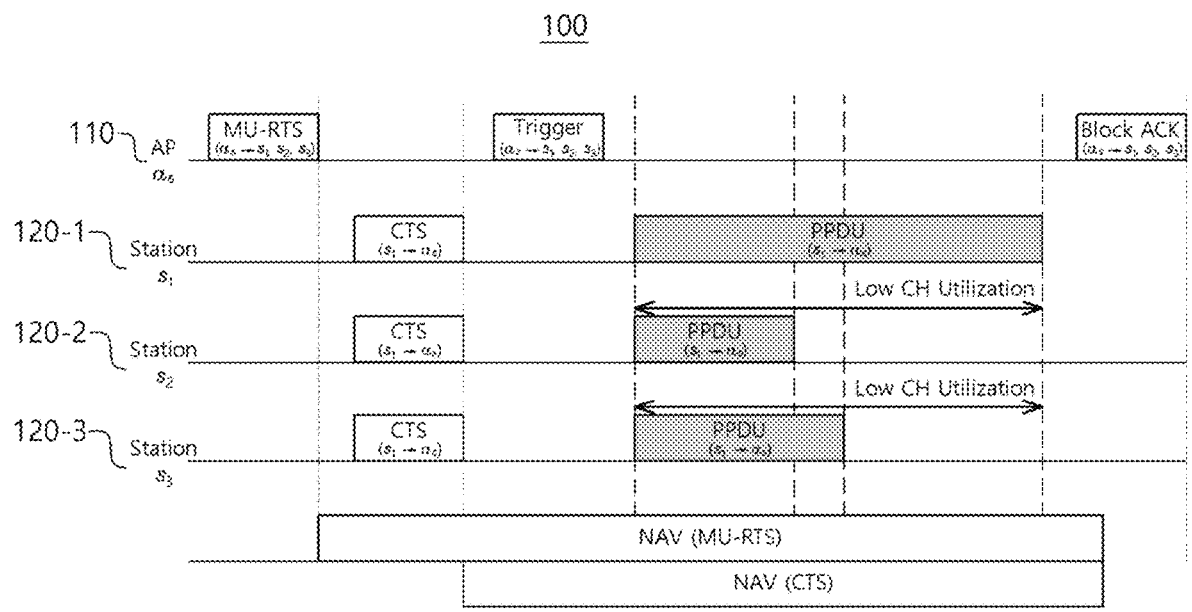

[FIG. 2]
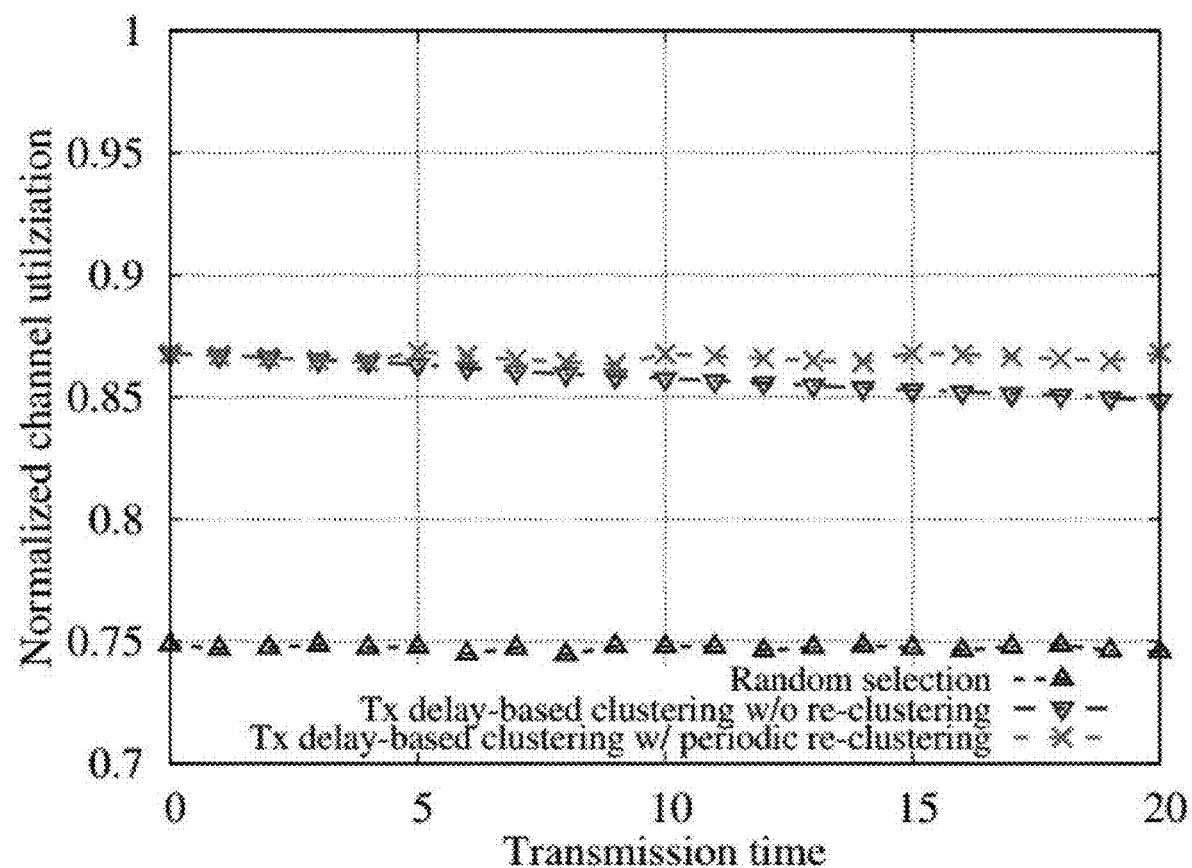

[FIG. 3]
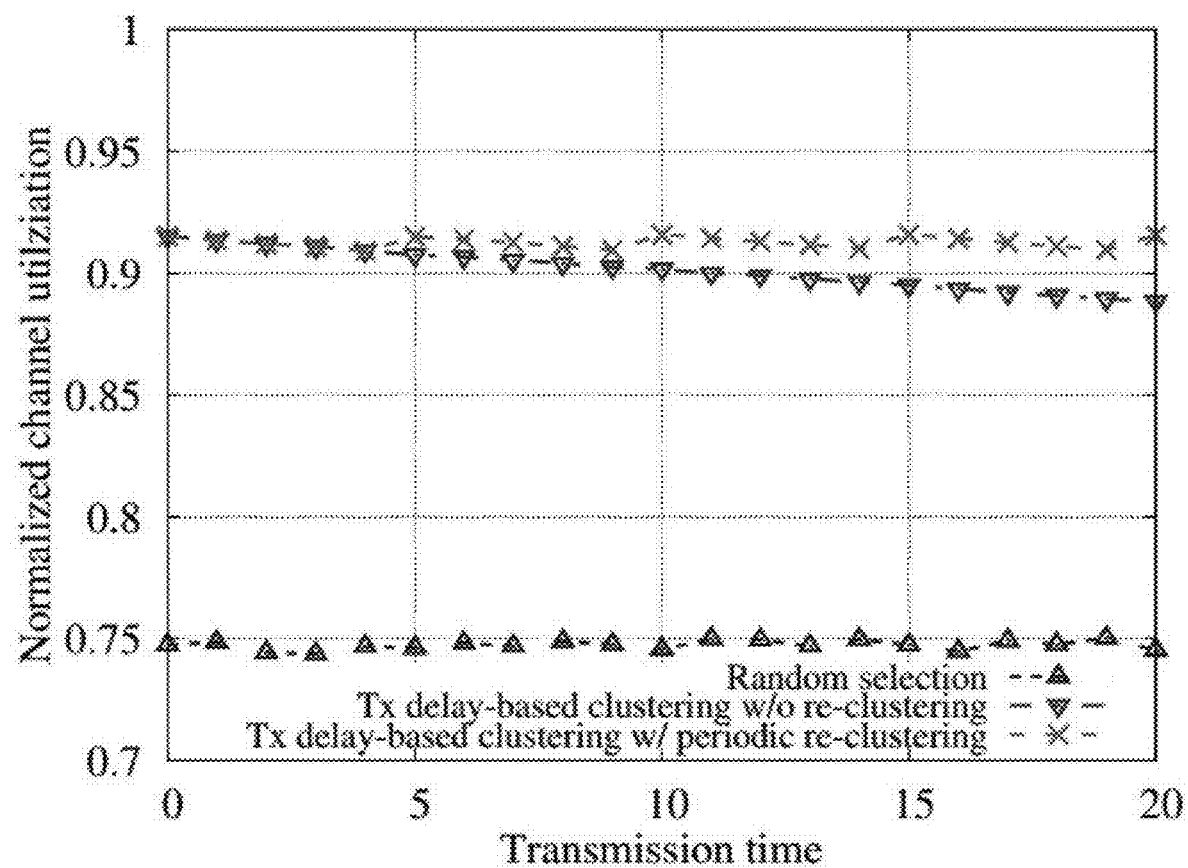

[FIG. 4]
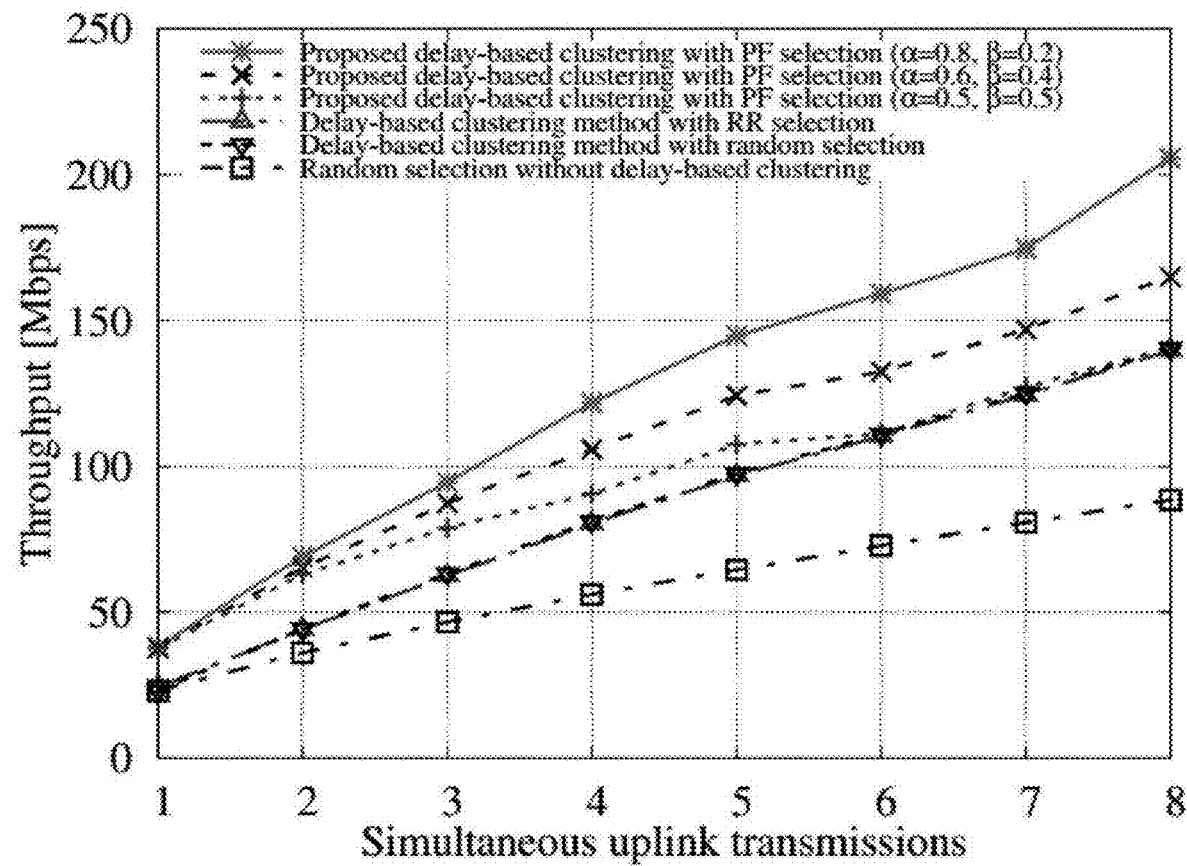

[FIG. 5]
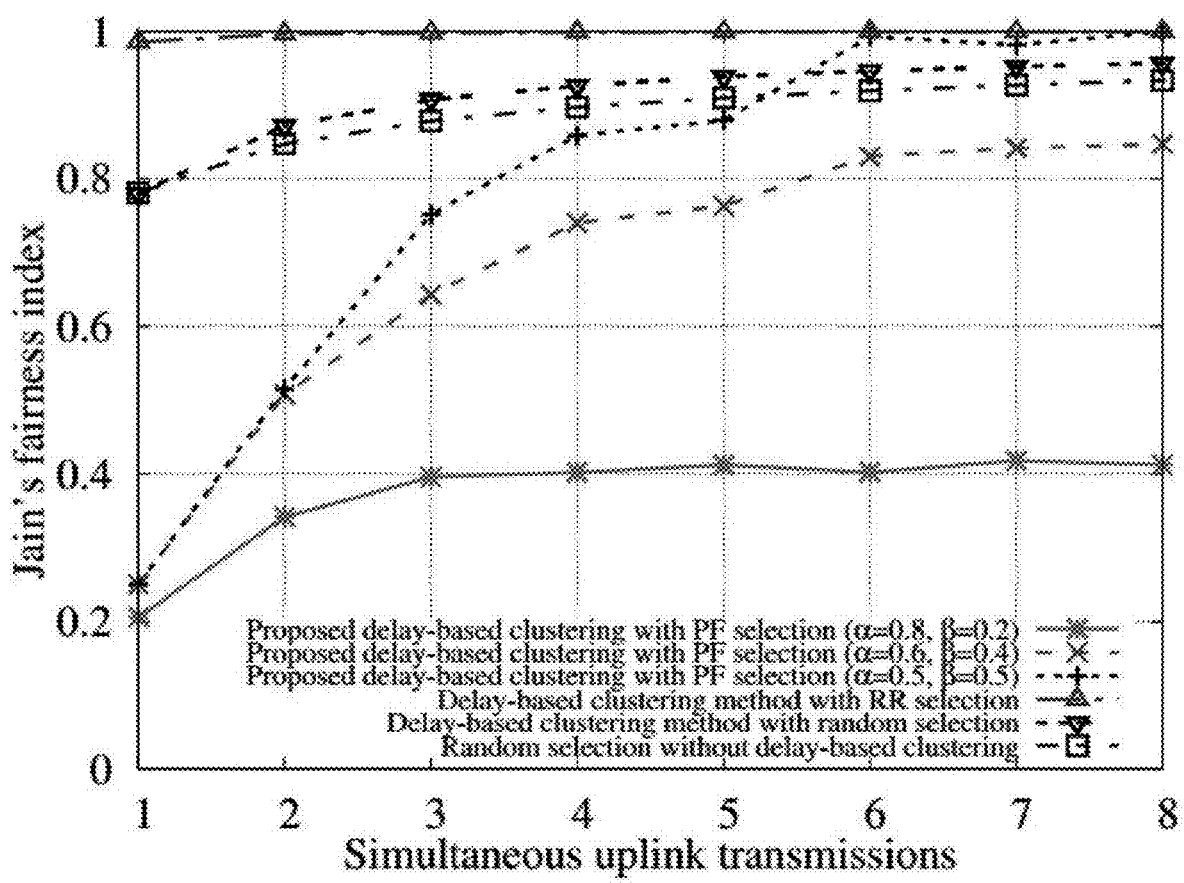

[FIG. 6]
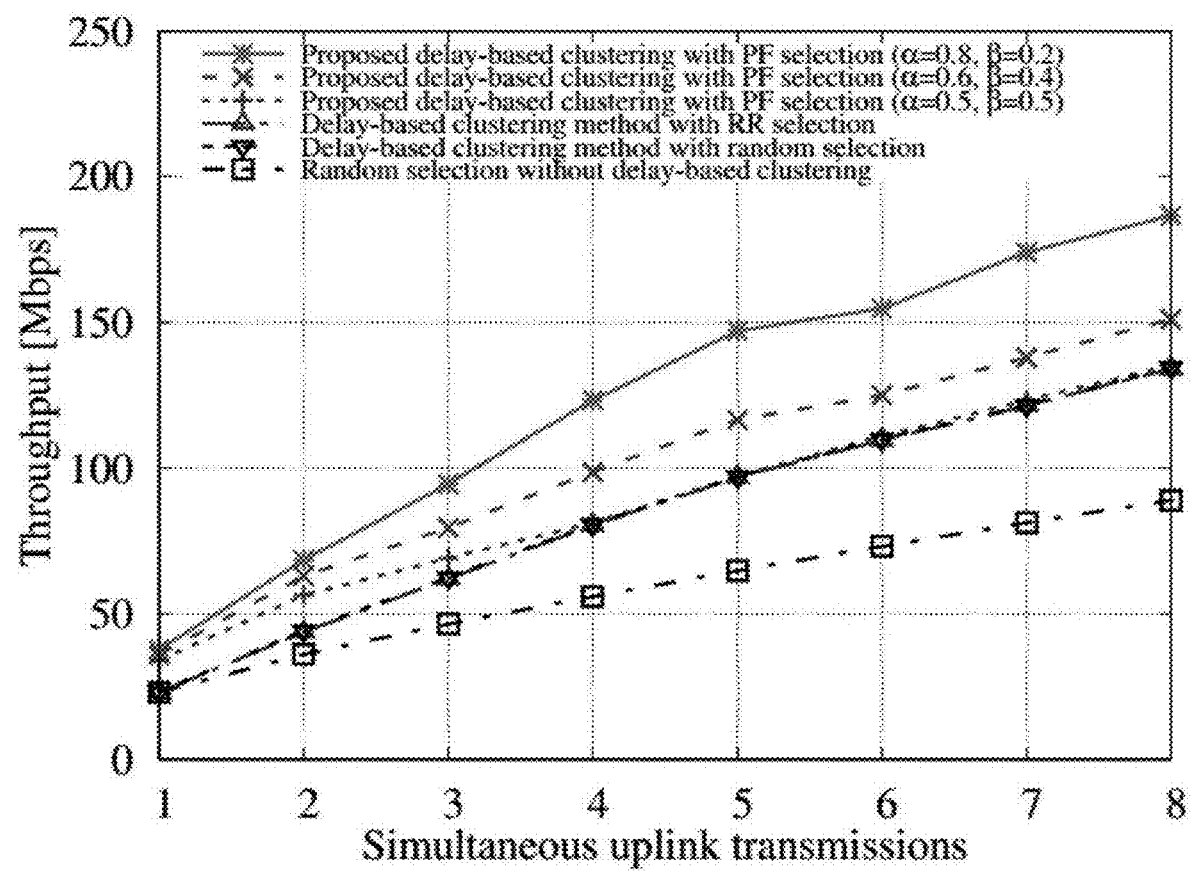

[FIG. 7]
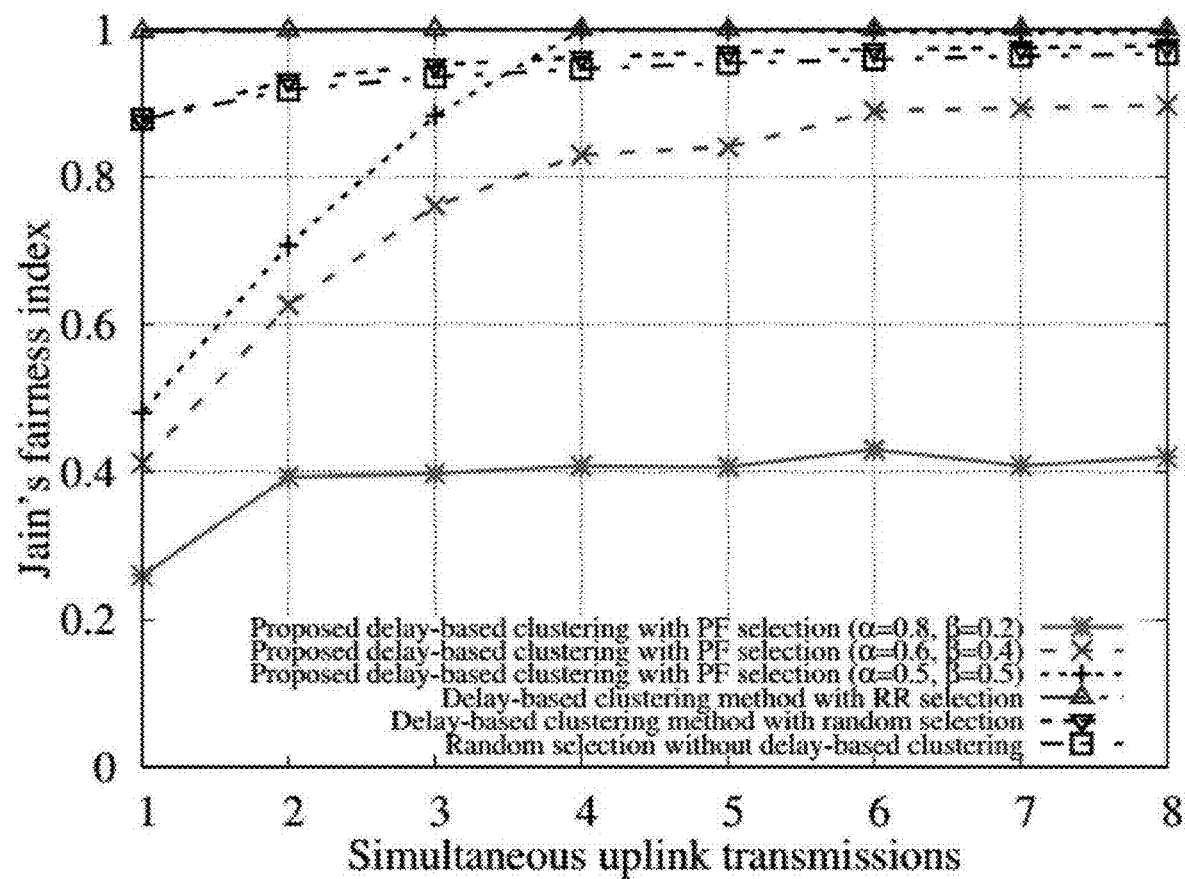

[FIG. 8]
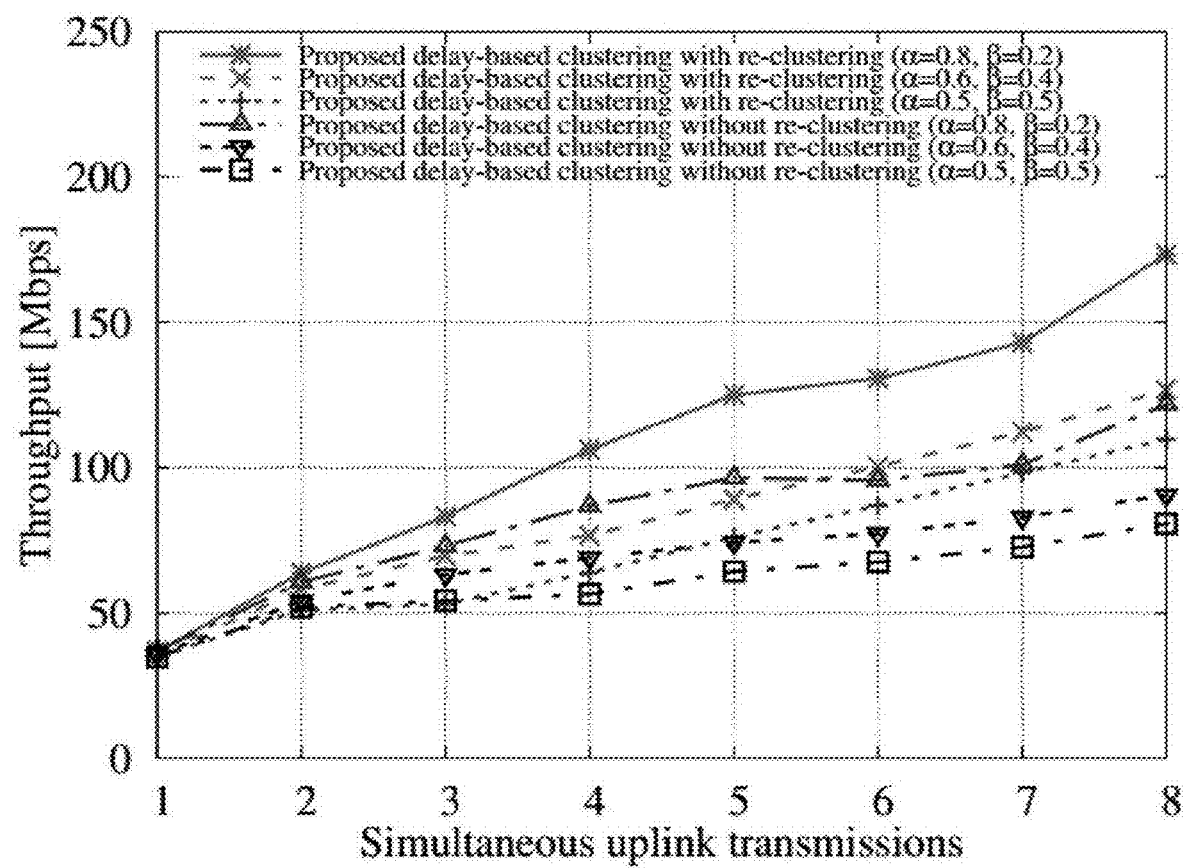

[FIG. 9]
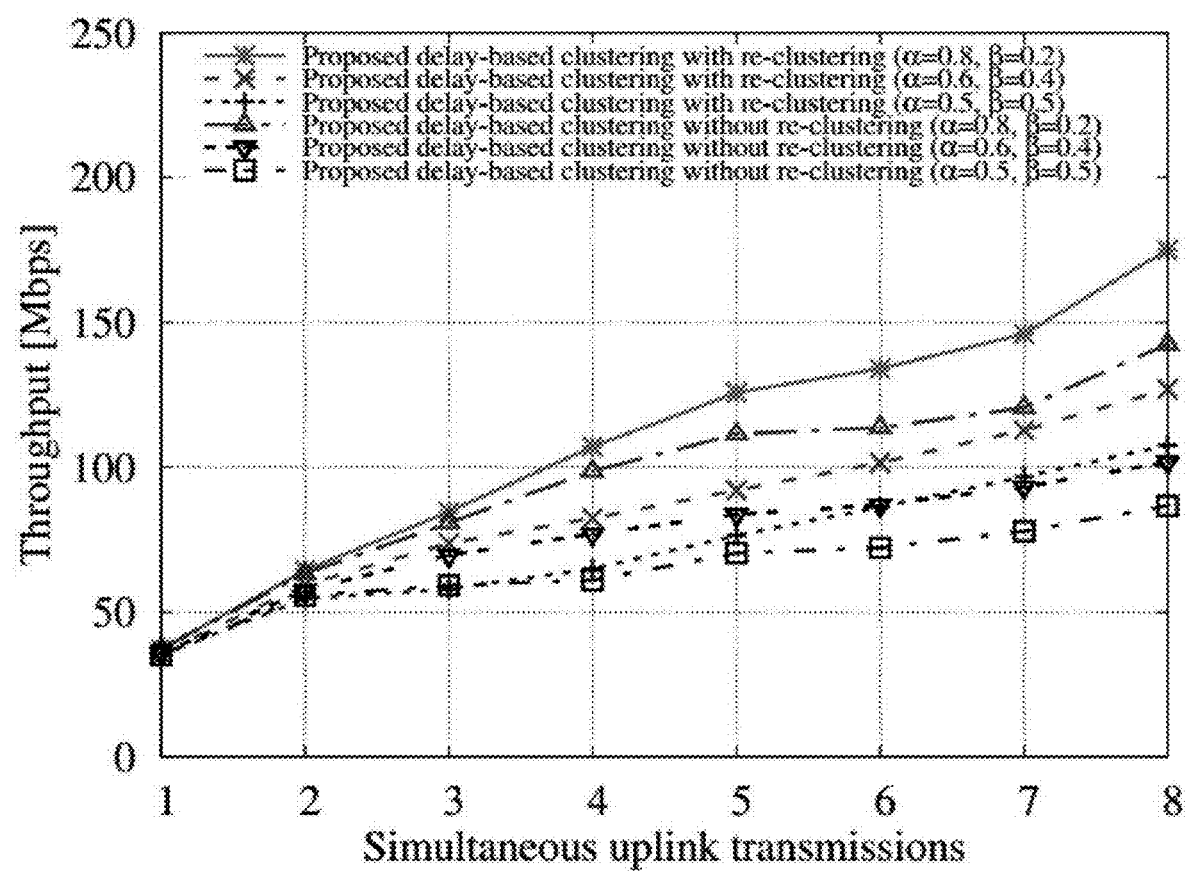

[FIG. 10]
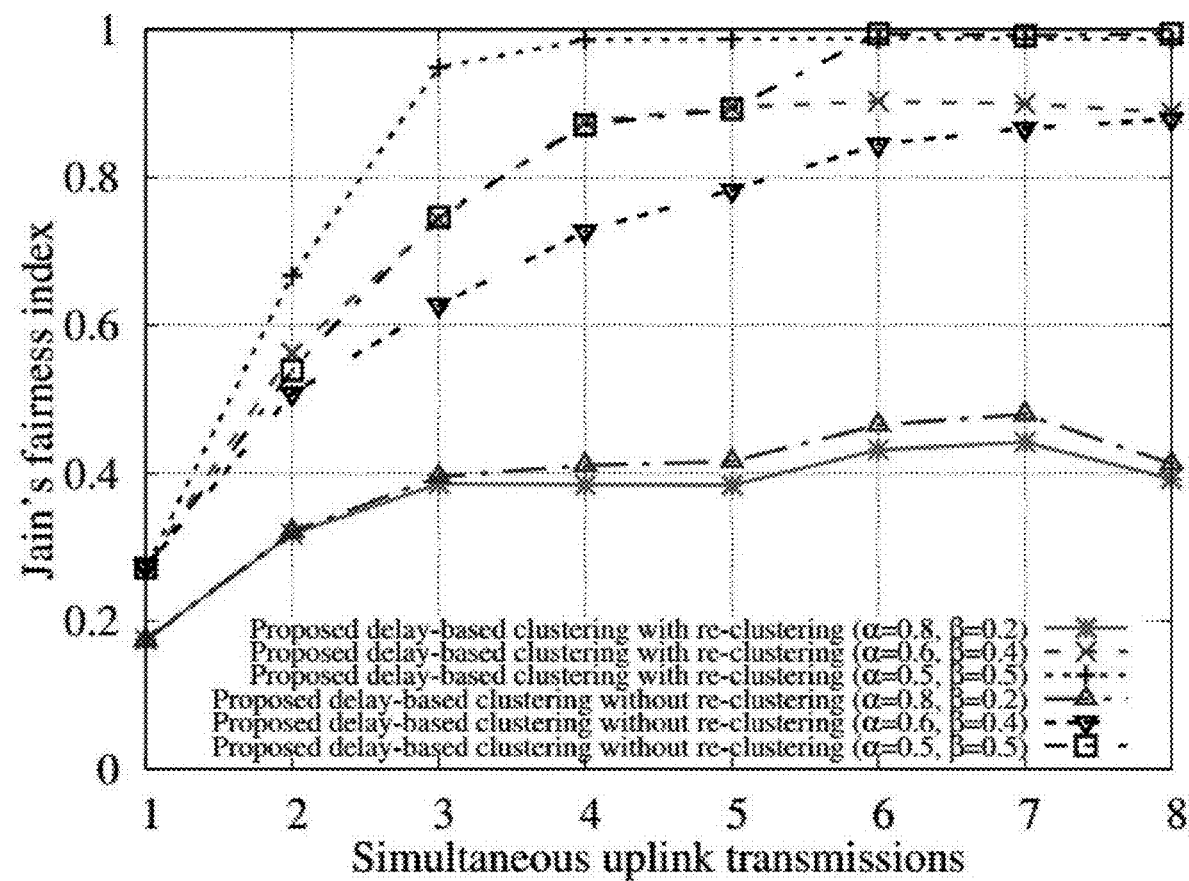

[FIG. 11]
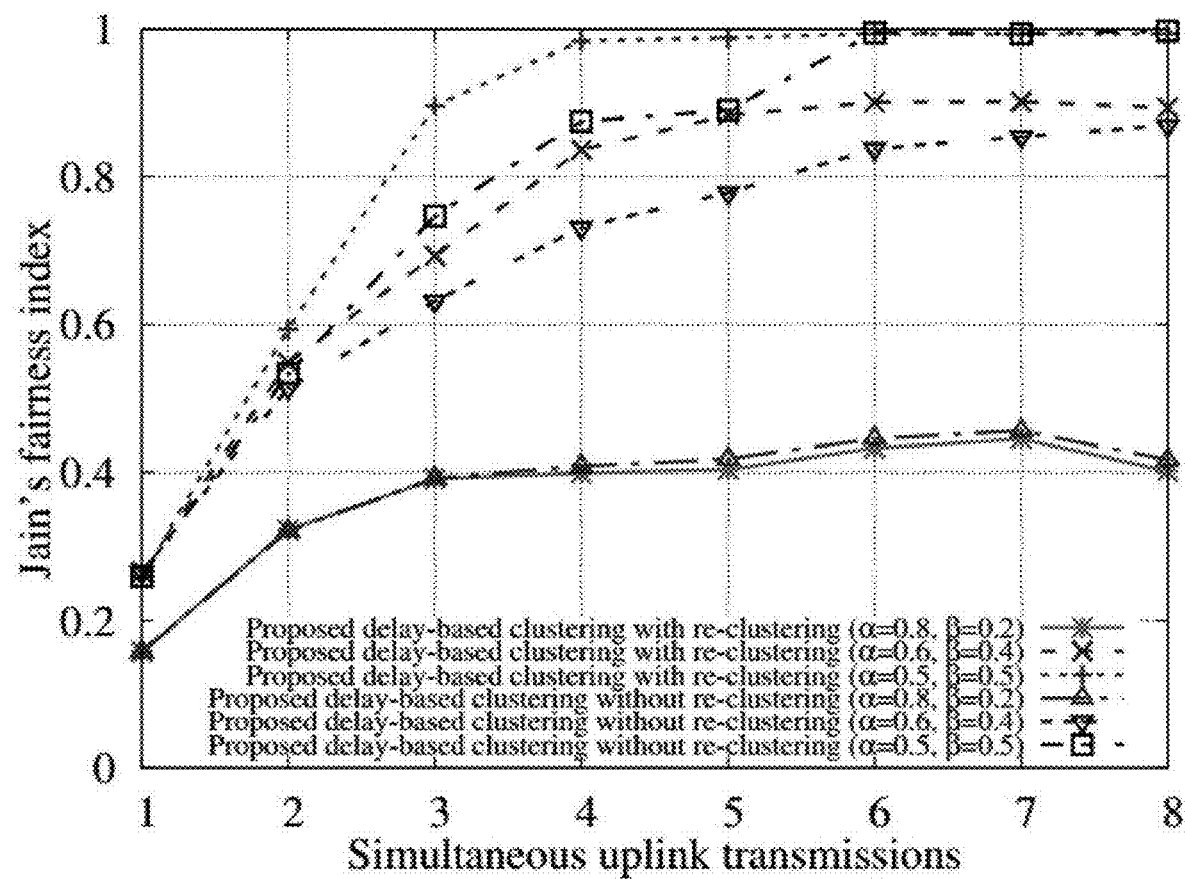

[FIG. 12]
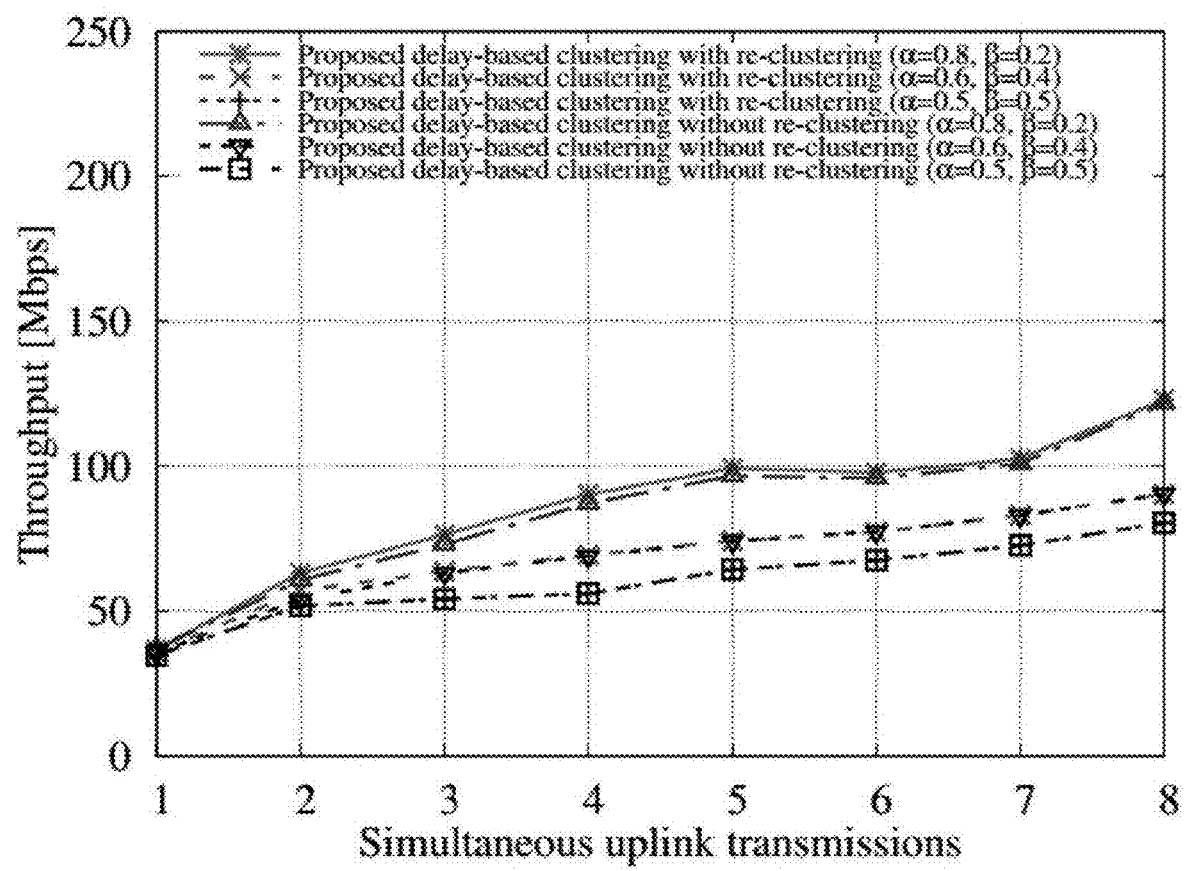

[FIG. 13]
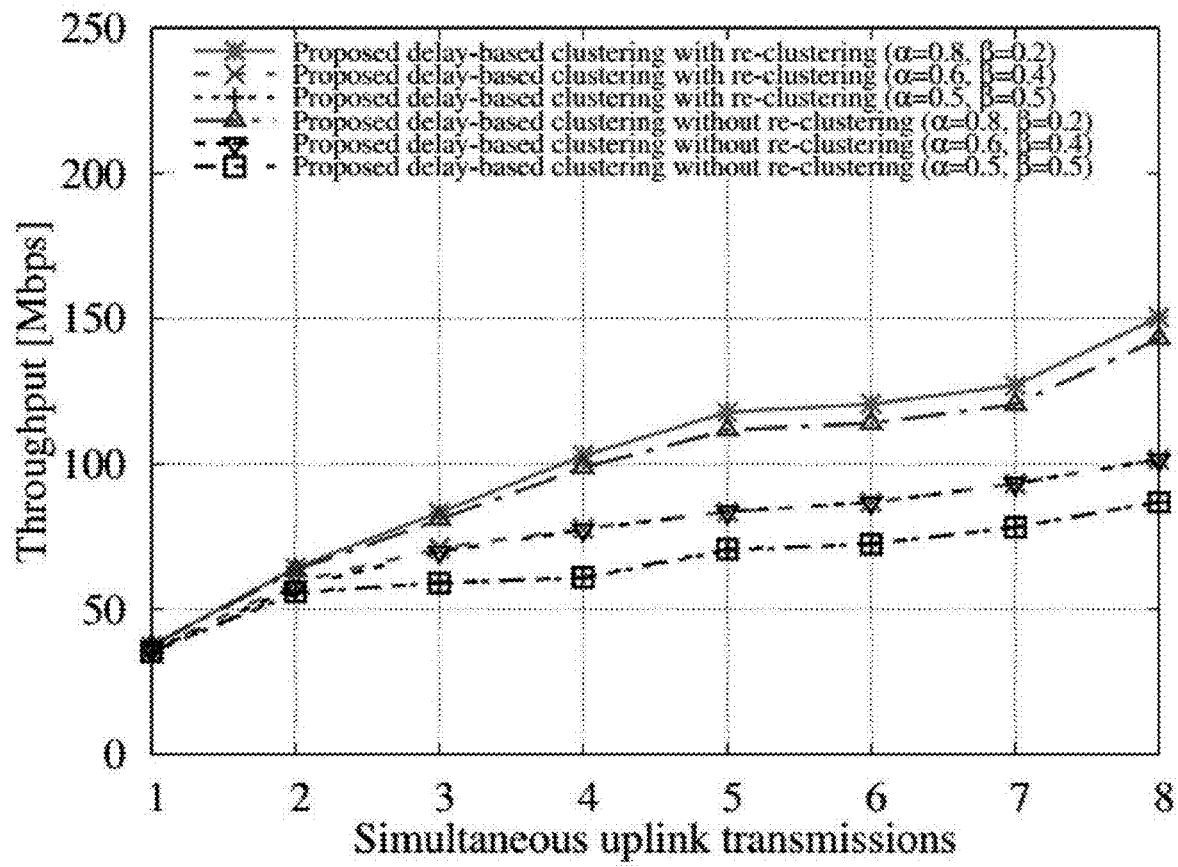
[FIG. 14]
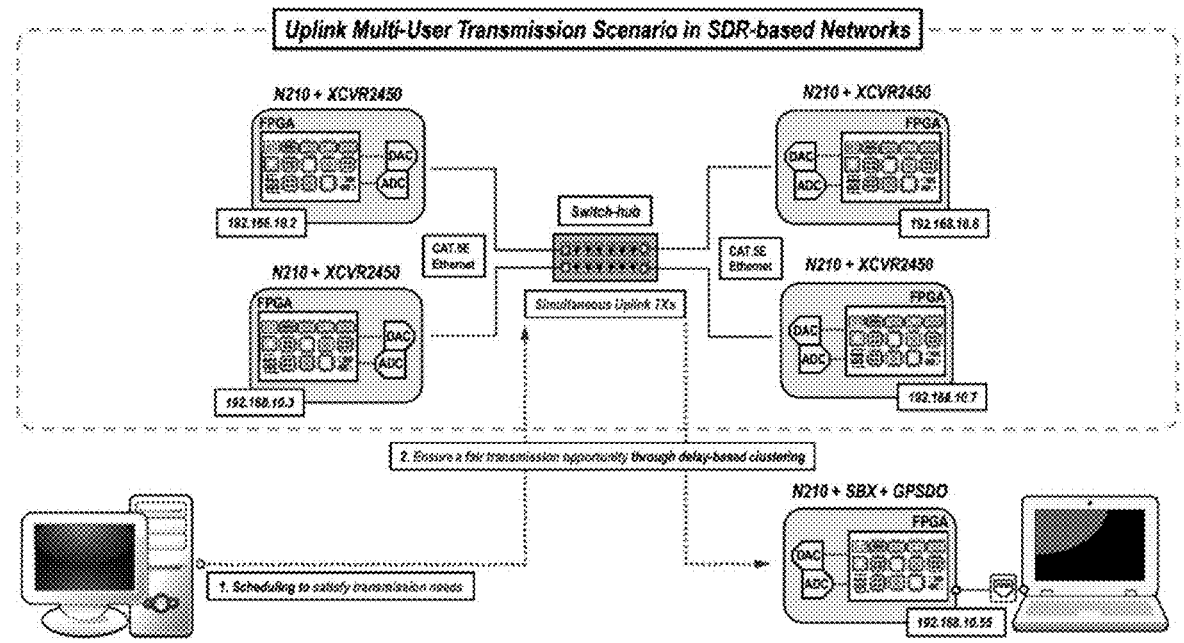

[FIG. 15]
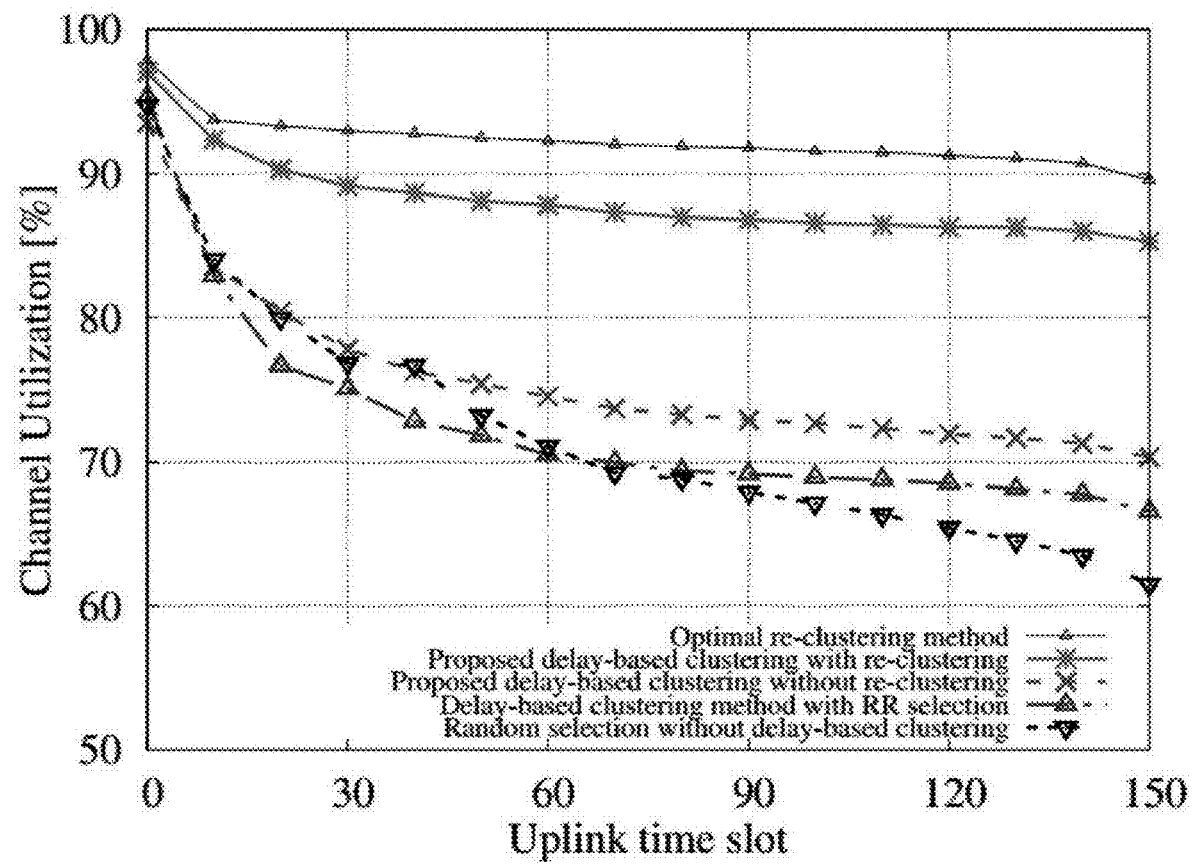

[FIG. 16]
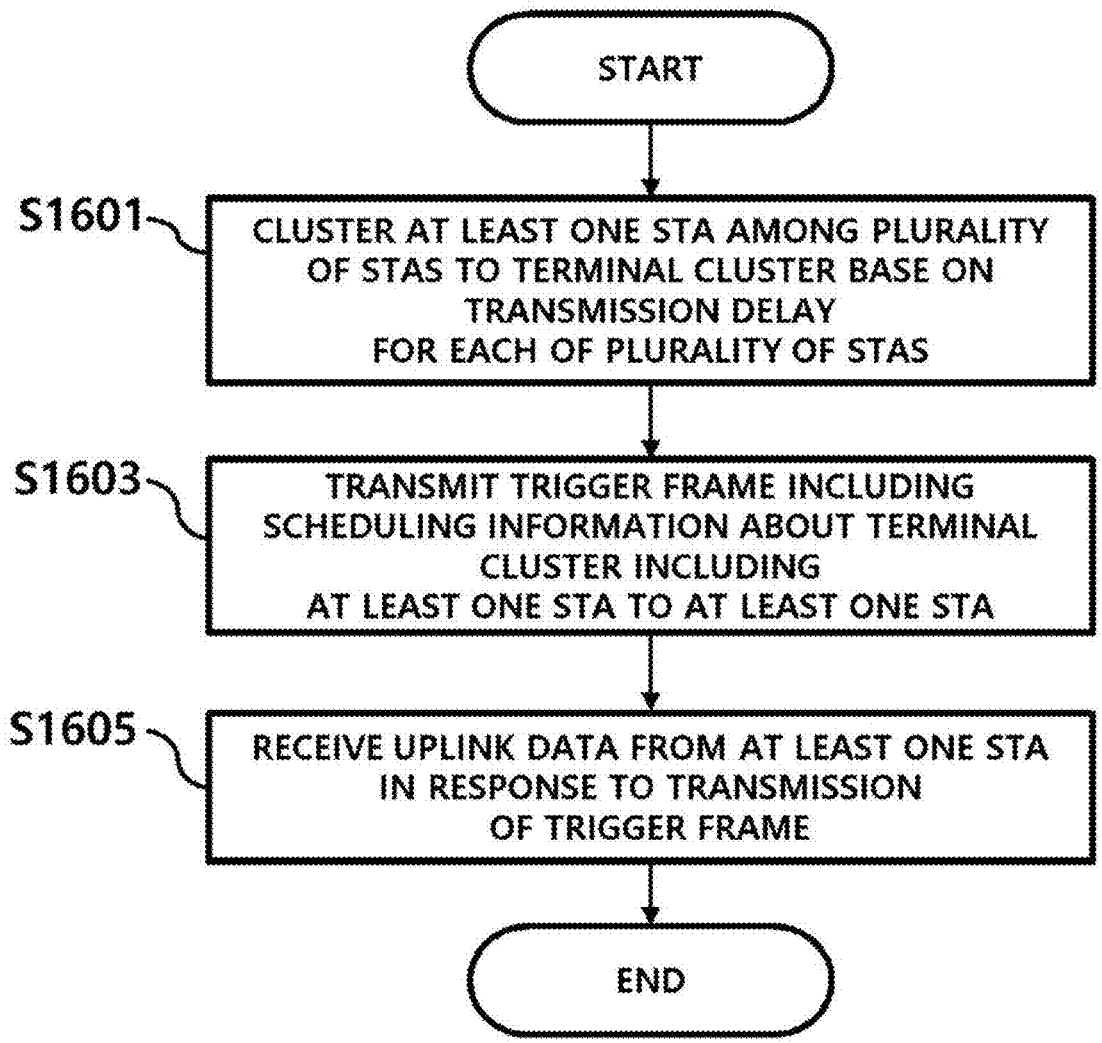

[FIG. 17]
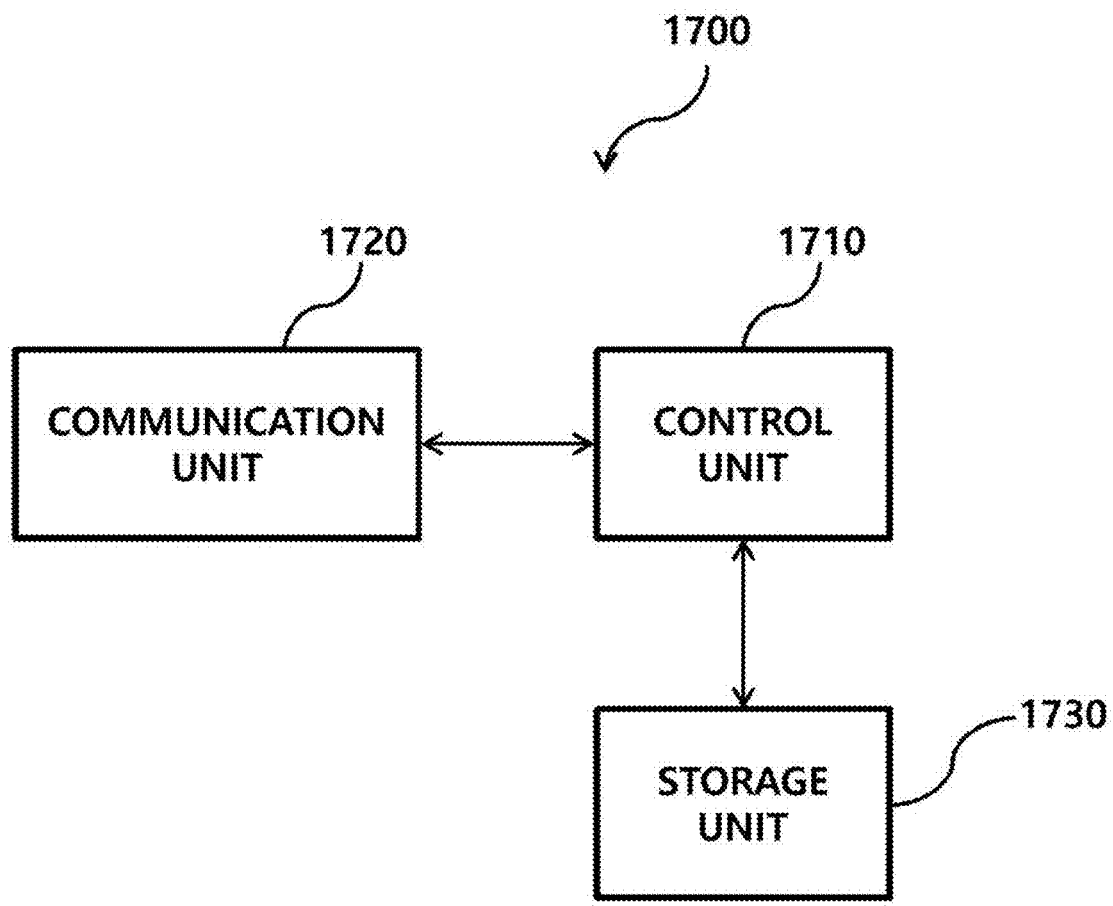

METHOD AND APPARATUS FOR MULTI-USER SCHEDULING FOR MINIMIZE TRANSMISSION DELAY

CROSS-REFERENCE TO RELATED APPLICATIONS

This application claims priority to and the benefit of Korean Patent Application No. 10-2021-0085916 filed on Jun. 30, 2021, which is incorporated herein by reference in its entirety.

TECHNICAL FIELD

The present invention relates to a method and an apparatus for multi-user scheduling for minimizing transmission delay, and more particularly, to a method and an apparatus for multi-user scheduling for minimizing transmission delay during up-link transmission.

BACKGROUND ART

Recently, along with the development of information and communication technology, various wireless communication technologies are being developed. Among them, a wireless local area network (WLAN) is a technology for wirelessly accessing the Internet at home, in a company, or a specific service area by using a portable terminal based on a radio frequency technology.

The standard for wireless LAN is established by Institute of Electrical and Electronics Engineers (IEEE) 802.11, and in 802.11ax, as the number of terminals rapidly increases in recent years, communication technologies that support multi-users in uplink communication as well as multi-users in downlink communication are being developed.

In this case, in the downlink communication, one AP performs transmission and a plurality of STAs performs reception at the same time. Further, in the uplink communication, the plurality of STAs simultaneously performs transmission, and one AP performs reception.

Accordingly, for the efficient uplink communication, a method of selecting the STAs that simultaneously perform the transmission is demanded, but the research on this is insufficient.

SUMMARY OF THE INVENTION

The present invention has been made in an effort to solve the foregoing problems, and an object of the present invention is to provide a method and an apparatus for multi-user scheduling for minimizing transmission delay.

Another object of the present invention is to provide a method and an apparatus for multi-user scheduling for clustering at least one STA among a plurality of STAs as a terminal cluster based on transmission delay for each of the plurality of STAs.

Another object of the present invention is to provide a method and an apparatus for multi-user scheduling for performing scheduling on a terminal cluster based on a proportional fair value representing a transmission priority of uplink data.

Another object of the present invention is to provide a method and an apparatus for multi-user scheduling for performing re-clustering based on a change in transmission delay for each of a plurality of STAs.

The objects of the present invention are not limited to the above-mentioned objects, and the not-mentioned objects will be clearly understood from the following description.

An exemplary embodiment of the present invention provides a method of multi-user scheduling for minimizing transmission delay according to an exemplary embodiment of the present invention includes: (a) clustering at least one station (STA) among a plurality of STAs to a terminal cluster based on transmission delay for each of the plurality of STAs; (b) transmitting a trigger frame including scheduling information about the terminal cluster including said at least one STA to said at least one STA; and (c) receiving uplink data from said at least one STA in response to the transmission of the trigger frame.

In the exemplary embodiment, the method may further include: before the operation (a), transmitting a multi-user request-to-send (MU-RTS) frame to the plurality of STAs; and receiving a clear-to-send (CTS) frame from each of the plurality of STAs in response to the transmission of the MU-RTS frame.

In the exemplary embodiment, the operation (a) may include determining the transmission delay for each of the plurality of STAs based on at least one of channel state information (CSI) and a buffer status response (BSR) for each of the plurality of STAs.

In the exemplary embodiment, the method may further include: between the operation (a) and the operation (b), determining a proportional fair value representing a transmission priority of the uplink data for said at least one clustered STA; and determining scheduling information about a terminal cluster having the smallest proportional fair value.

In the exemplary embodiment, the method may further include: after the operation (a), re-clustering at least one STA among the plurality of STAs based on a change in the transmission delay for each of the plurality of STAs.

Another exemplary embodiment of the present invention provides a multi-user scheduling apparatus for minimizing transmission delay including: a control unit configured to cluster at least one station (STA) among a plurality of STAs to a terminal cluster based on transmission delay for each of the plurality of STAs; and a communication unit configured to transmit a trigger frame including scheduling information about the terminal cluster including said at least one STA to said at least one STA, and receive uplink data from said at least one STA in response to the transmission of the trigger frame.

In the exemplary embodiment, the communication unit may transmit a multi-user request-to-send (MU-RTS) frame to the plurality of STAs, and receive a clear-to-send (CTS) from each of the plurality of STAs in response to the transmission of the MU-RTS frame.

In the exemplary embodiment, the control unit may determine the transmission delay for each of the plurality of STAs based on at least one of channel state information (CSI) and a buffer status response (BSR) for each of the plurality of STAs.

In the exemplary embodiment, the control unit may determine a proportional fair value representing a transmission priority of the uplink data for said at least one clustered STA, and determine scheduling information about a terminal cluster having the smallest proportional fair value.

In the exemplary embodiment, the control unit may re-cluster at least one STA among the plurality of STAs based on a change in the transmission delay for each of the plurality of STAs.

Specific details for achieving the above objects will become clear with reference to the exemplary embodiments to be described in detail in conjunction with the accompanying drawings.

However, the present invention is not limited to the exemplary embodiments disclosed below, and may be configured in various different forms, and is provided to complete the disclosure of the present invention and fully inform the scope of the present invention to those skilled in the art.

According to the exemplary embodiment of the present invention, it is possible to improve network processing performance by improving channel utilization of an uplink multi-user transmission scenario.

Further, according to the exemplary embodiment of the present invention, it is possible to efficiently increase the network throughput without degradation of fairness between the STAs using the STA cluster having high channel efficiency.

The effects of the present invention are not limited to the foregoing effects, and potential effects expected by the technical characteristics of the present invention will be clearly understood from the following description.

BRIEF DESCRIPTION OF THE DRAWINGS

FIGS. 1A and 1B are diagrams illustrating an uplink multi-user transmission system according to an exemplary embodiment of the present invention.

FIG. 2 is a diagram illustrating a channel utilization graph in the case where the number of STAs is 16 according to the exemplary embodiment of the present invention.

FIG. 3 is a diagram illustrating a channel utilization graph in the case where the number of STAs is 24 according to the exemplary embodiment of the present invention.

FIG. 4 is a graph representing network throughput performance in the case where the number of STAs is 200 according to the exemplary embodiment of the present invention.

FIG. 5 is a graph representing fairness performance in the case where the number of STAs is 200 according to the exemplary embodiment of the present invention.

FIG. 6 is a graph representing network throughput performance in the case where the number of STAs is 100 according to the exemplary embodiment of the present invention.

FIG. 7 is a graph representing fairness performance in the case where the number of STAs is 100 according to the exemplary embodiment of the present invention.

FIG. 8 is a graph representing network throughput performance in the case where Modulation and Coding Schemes (MCSs) of 80% of the STAs are changed and A is 1.5 according to the exemplary embodiment of the present invention.

FIG. 9 is a graph representing network throughput performance in the case where the MCSs of 40% of the STAs are changed and $\lambda$ is 1.5 according to the exemplary embodiment of the present invention.

FIG. 10 is a graph representing fairness performance in the case where the MCS of 80% the STAs are changed and $\lambda$ is 1.5 according to the exemplary embodiment of the present invention.

FIG. 11 is a graph representing fairness performance in the case where the MCSs of 40% of the STAs are changed and $\lambda$ is 1.5 according to the exemplary embodiment of the present invention.

FIG. 12 is a graph representing network throughput performance in the case where the MCSs of 80% of the STAs are changed and $\lambda$ is 1.9 according to the exemplary embodiment of the present invention.

FIG. 13 is a graph representing network throughput performance in the case where the MCSs of 40% of the STAs are changed and $\lambda$ is 1.9 according to the exemplary embodiment of the present invention.

FIG. 14 is a diagram illustrating a software-defined wireless device-based test bed according to the exemplary embodiment of the present invention.

FIG. 15 is a graph representing channel utilization performance according to the exemplary embodiment of the present invention.

FIG. 16 is a diagram illustrating a method of multi-user scheduling for minimizing transmission delay according to an exemplary embodiment of the present invention.

FIG. 17 is a diagram illustrating an apparatus for multi-user scheduling for minimizing transmission delay according to an exemplary embodiment of the present invention.

DETAILED DESCRIPTION

The present invention may have various modifications and exemplary embodiments and thus specific exemplary embodiments will be illustrated in the drawings and described in detail.

Various characteristics of the invention disclosed in the claims may be better understood upon consideration of the drawings and detailed description. The apparatuses, methods, and various exemplary embodiments disclosed in the specification are provided for the purpose of illustration. The disclosed structural and functional features are intended to enable those skilled in the art to specifically carry out the various exemplary embodiments, and not to limit the scope of the present invention. The terms and sentences disclosed are for the purpose of easy-to-understand descriptions of various features of the present invention, and are not intended to limit the scope of the invention.

In the description of the present invention, when a detailed description of a related publicly known technology is determined to unnecessarily make the subject matter of the present invention unclear, the detailed description and a detailed illustration thereof will be omitted.

Hereinafter, a method and an apparatus for multi-user scheduling for minimizing transmission delay according to an exemplary embodiment of the present invention will be described.

FIGS. 1A and 1B are diagrams illustrating an uplink multi-user transmission system 100 according to an exemplary embodiment of the present invention.

Referring to FIGS. 1A and 1B, the uplink multi-user transmission system 100 may be formed of an access point (AP) 110 and a plurality of stations (STAs) 120-1 to 120-3.

The AP 110 may perform uplink communication with the plurality of STAs 120-1 to 120-3, and the AP 110 may simultaneously receive uplink data from the plurality of STAs 120-1 to 120-3.

In this case, when uplink data transmission time of each of the plurality of STAs 120-1 to 120-3 is different, channels between the AP 110 and the plurality of STAs 120-1 to 120-3 are not sufficiently utilized, so that there may occur a problem in that multi-user uplink communication performance may deteriorate.

Accordingly, the AP 110 according to various exemplary embodiments of the present invention may classify the STAs having similar uplink data transmission times among the plurality of STAs 120-1 to 120-3 into terminal groups, select a terminal group to actually perform the uplink communication according to a proportional fair scheduling method among the classified terminal groups, and receive the uplink data from the selected terminal group, thereby improving uplink communication performance.

In the present invention, the uplink multi-user scheduling method based on transmission delay related to a multi-user scheduling process in the IEEE 802.11ax network will be described.

The scheduling method according to the present invention may be formed of two parts of STA clustering and cluster scheduling.

In the case of the STA clustering, the method according to the present invention may determine a terminal cluster of the STAs desired to participate in the uplink transmission process.

The terminal clustering is performed based on expected transmission delay of the STA, and the STA having the similar transmission delay may be clustered together for the simultaneous uplink transmission.

Through the transmission delay-based clustering, the communication channel between the uplink multi-user transmission of the STA and eth block ACK transmission of the AC may be efficiently utilized.

When the channel utilization of the transmission delay-based clustering method, network throughput performance of the uplink multi-user transmission process regularized in IEEE 802.11ax may be improved.

In the case of the cluster scheduling, the AP may select a cluster and perform scheduling so that the STA of the selected cluster performs uplink transmission. The terminal cluster may be scheduled based on the proportional fair-based access method for improving the network throughput performance without severe degradation of fairness.

In the exemplary embodiment, the transmission delay-based STA clustering method according to the present invention may improve channel utilization of an uplink multi-user transmission scenario in IEEE 802.11ax and improve network processing performance.

The AP may trigger an appropriate STA so as to participate in the uplink multi-user transmission so that the uplink channel is efficiently utilized through the information reported from the STA.

The method according to the present invention may efficiently increase the network throughput without degradation of fairness between the STAs using the STA cluster having high channel efficiency.

In the exemplary embodiment, the AP may perform re-clustering for improving network processing performance in the uplink transmission scenarios in a time-varying channel environment.

In the exemplary embodiment, the AP 110 and the STAs 120-1 to 120-3 may be represented as $a_S$, and $S=\{s_1, s_2, \ldots, s_S\}$, respectively.

In the network, with the help of the MU-MIMO and OFDMA technologies, the AP, aS, may simultaneously receive multiple data streams transmitted from multiple STAs of S. In order to perform the uplink multi-user transmission, the AP and each STA may be notified in advance.

A channel sounding process for obtaining the CSI in IEEE 802.11ax standard may be designated as follows.

First, the AP may broadcast a Null Data Packet (NDP) notification and then initiate a channel sounding process through the NDP.

Then, the AP may transmit a Beamforming Report (BFRP) trigger frame to each STA, and the STA may respond to the BFRP trigger by transmitting CSI information to the AP.

The BFRP trigger frame in the channel sounding process may be repeatedly transmitted in one or more sequences in order to obtain the CSI of all STAs existing in the network.

Buffer state information of the STA may also be notified to the AP together with the channel sounding process. In IEEE 802.11ax standard, a Buffer Status Report (BSR) may be implicitly reported in a QoS control filed or a BSR control field, and may be explicitly reported by the BAR poll (PSRP) of the AP.

$H_{aS,si}$ may represent a channel between each STA and the AP estimated in the channel sounding process. Then, the signal-to-interference+noise power of each uplink signal transmitted from the STA to the AP may be expressed as Equation 1.

$$\gamma_{a_S,s_i} = \frac{p_{s_i}|H_{a_S,s_i}|^2}{\sum_{k_j \in S} p_{a_j}|H_{a_S,s_j}|^2 + \sigma^2}, \quad [\text{Equation 1}]$$

Herein, $p_{si}$ is transmission power of $s_i$, and $\sigma_2$ represents noise power. A maximum uplink transmission speed of each STA may be different according to estimated SINR $\gamma_{aS,si}$ and a Modulation and Coding Scheme (MCS) designated in IEEE 802.11ax.

In the present invention, each STA may transmit data at a maximum transmission rate, and $R_{si}(\bullet)$ represents a mapping function introducing an uplink transmission rate. That is, the transmission rate of $STA_{si}$ may be represented by $R_{si}(\gamma_{aS,si})$.

In the exemplary embodiment, in the present invention, each uplink transmission may have the same bandwidth, and Bas represents a maximum capacity of the simultaneous uplink multi-user transmission in the network. That is, $AP_{aS}$ may simultaneously receive the maximum Bas data stream.

In the uplink multi-user user transmission scenario of IEEE 802.11ax, the AP may allow up to S STAs to simultaneously transmit data at a speed of $R_{si}(\gamma_{aS},s_i)$ for each $STAs_i$.

The uplink multi-user user transmission may generally prevent spectrum non-efficiency due to excessive competition between the STAS and improve network throughput performance.

However, when there is a large difference in transmission delay between the STAs selected for the uplink multi-user user transmission, network processing performance may be degraded due to a low channel utilization rate.

FIG. 1 may represent the uplink multi-user user transmission scenario using one AP and three STAs in the IEEE 802.11ax network. In the exemplary embodiment, in FIG. 1, the number of STAs is three, but is not limited thereto, and the network may include at least one STA.

First, $APa_S$ may transmit a multi-user Request-To-Send (RTS) frame to $STAs_1, s_2, s_3$.

Next, the STA may respond to the RTS by transmitting a Clear-To-Send (CTS) frame to the AP.

Second, the AP may transmit a trigger frame including scheduling information.

The scheduled STA may transmit the uplink data stream to the $APa_S$. After receiving the uplink data stream transmitted from the scheduled STA, the $APa_S$ may transmit a block ACK to the STA with an efficient and simple response mechanism in IEEE 802.11ax.

However, as can be seen in FIG. 1, inadequate STA scheduling for the uplink transmission may result in low channel utilization.

The STA may transmit data of different sizes at different transmission rates. That is, there may be a difference in the transmission delay of the STA scheduled for the uplink transmission.

Accordingly, the larger the transmission delay difference between the scheduled STAS is, the longer the network allocation vector (NAV) is, and the unscheduled STAs have fewer transmission opportunities even if the STA does not occupy the channel.

The transmission delay-based scheduling access method for the uplink multi-user transmission may improve channel utilization and network throughput performance in IEEE 802.11ax.

The transmission delay-based scheduling method according to the present invention is formed of two steps, and each step may improve channel utilization and fairness of the STA for the uplink transmission.

First, the STA possessing the uplink transmission data is clustered according to the transmission delay, so that channel utilization may be improved. The AP may calculate the transmission delay of the STA, form a cluster, and cluster the STAs having the similar transmission delay together.

Second, a cluster for the uplink multi-user transmission may be selected according to the proportional fair-based scheduling. The proportional fairness may be calculated for each cluster, and the AP may determine a cluster for the uplink multi-user transmission.

In the exemplary embodiment, in the aspect of the transmission delay-based STA clustering, in order to improve clustering-based channel utilization, the STAs having the similar transmission delay may be clustered together in the scheduling method according to the present invention. In order to obtain the CSI, the channel sounding process may progress in advance.

SINR information for each uplink STA after the channel sounding may be represented as Equation 1, and the maximum uplink transmission rate of each STA may be represented as $R_{si}(\gamma_{aS,si})$. $Q_{si}$ represents a size of the uplink data which $STA_{si} \in S$ attempts to transmit to the AP.

Then, the transmission delay of the $STA_{si}$ may be represented as Equation 2.

$$d_{si} = Q_{si}/R_{si}(\gamma_{sS,si})$$ [Equation 2]

Each STA may have different transmission delays $d_{si}$, $s_i \in S$. The method according to the present invention may be configured so that the STAs having the similar transmission delay simultaneously transmit the uplink data by forming the STA cluster based on the transmission delay $d_{si}$ of each STA.

The AP may designate $C^{UL} = \{C_1^{UL}, C_2^{UL}, C_3^{UL}, \ldots\}$ to an STA cluster set. Herein, for $C_1^{UL}, C_m^{UL} \subset C^{UL}$, $C^{UL}\{\{s_i\}|s_i \in S\}$ and $C_l^{UL}$ and $C_l^{UL} \cap C_m^{UL} = \emptyset$ may be represented.

For $C_1^{UL} \subset C^{UL}$, a function representing the transmission delay difference between two STAS in the same cluster may be defined as $\tau(d_{s_i}, d_{s_j}) = |d_{s_i} - d_{s_j}|$, $s_i \neq s_j \in C_l^{UL}$. In the method according to the present invention, the cluster is configured so as to minimize the maximum difference in the transmission delay of the cluster, and the STA clustering problem may be represented as Equation 3.

$$\min_{d_{s_i}, d_{s_j} \in C_l^{UL}, \subset C^{UL}} \max \tau(d_{s_i}, d_{s_j})$$ [Equation 3]

subject to $$1 \leq |C_l^{UL}| \leq B_{aS}, C_l^{UL} \subset C^{UL}$$

$$s_i \in C^{UL}, \forall s_i \in S.$$

When there are available frequency bands due to the small number of STAs participating in the uplink multi-user transmission, that is, $|C_1^{UL}| < B_{aS}$, the usable frequency resource may also be utilized through the downlink transmission or the channel sounding for a newly joined STA.

Accordingly, the present invention focuses on the uplink multi-user transmission, and the method according to the present invention may maximally utilize an available bandwidth by using the maximum number of STAs for the uplink multi-user transmission.

When it is assumed that the STA is clustered in order to maximize the size of the cluster and the maximum number of STAs is scheduled to simultaneously transmit the uplink data, that is, $|C_1^{UL}| < B_{aS}$, the problem of Equation 3 may be easily solved with the greedy approach.

In FIGS. 1A and 1B, it is illustrated that three STAs are present in the uplink multi-user transmission system 100, but this is merely an example, and the number of STAs is not limited.

In terms of numerical analysis of channel utilization, it is possible to present channel utilization efficiency of the transmission delay-based STA clustering according to the present invention. The STA clustering method according to the present invention may improve uplink channel utilization of the multi-user transmission according to the scenario specified in IEEE 802.11ax.

The AP may calculate an expected transmission delay of each STA based on the CSI and the BSR of the STA which desires to participate in the uplink multi-user transmission.

Next, the AP may cluster the STAs having the similar transmission delay together for the simultaneously uplink transmission. In the exemplary embodiment, the AP may cluster the corresponding STAs of which the transmission delay is equal to or smaller than a threshold.

It may be suggested that a performance analysis for the transmission delay-based STA clustering according to the present invention is performed, and that the method according to the present invention improves channel utilization of the uplink multi-user transmission in IEEE 802.11ax.

In order to prove the concept of the transmission delay-based STA clustering, normalized channel utilization may be compared through a simulation. The normalized channel utilization as the average transmission delay normalized by the maximum one among the selected STAs may be defined.

In the simulation, it is assumed that all of the transmission rates of the STAs selected for the uplink transmission are the same, and a packet arrival rate may follow a Poisson distribution. When the transmission speeds for the STAs selected for the uplink multi-user transmission are the same, a size of the PPDU may be directly related to the transmission delay.

Accordingly, when the sizes of the all of the uplink PPDUs of the selected STAs are the same, the normalized channel use rate may be 1.

As the normalized channel use rate approaches 1, a channel use rate may decrease during the time between the end of PPDU transmission and the start of block ACK transmission.

The channel utilization of the transmission delay-based clustering method having periodical re-clustering, the transmission delay-based clustering method without re-clustering, and a random selection method may be compared. In the simulation, the number of simultaneous uplink transmission may be set to 8. That is, eight STAs may be selected.

FIG. 2 is a diagram illustrating a channel utilization graph in the case where the number of STAs is 16 according to the exemplary embodiment of the present invention.

Referring to FIG. 2, a result of channel utilization for the transmission time when eight STAs are selected among 16 STAs for the uplink transmission may be confirmed.

As can be seen from the result, the transmission delay-based STA clustering may have higher channel utilization performance than that of the random selection method.

However, performance of the transmission delay-based clustering method without clustering is degraded over time, but the random selection method may exhibit constant channel utilization performance.

This may be because the transmission delay changes over time depending on the transmission environment, such as a packet arrival rate or a transmission rate.

In order to compensate for the change in the transmission environment, the STA may need to be clustered again according to the expected transmission delay. The transmission delay-based clustering method through re-clustering performs the STA clustering every five times, and it can be seen that the channel utilization performance is superior compared to other method.

FIG. 3 is a diagram illustrating a channel utilization graph in the case where the number of STAs is 24 according to the exemplary embodiment of the present invention.

Referring to FIG. 3, the channel utilization result for the transmission time when the STAs are 24 may be confirmed.

The simulation result is similar to that shown in FIG. 2, but may indicate that re-clustering is more important in a network with many STAs. For the calculation of the transmission delay, the BSR and the CSI of the STA that desires to participate in the uplink multi-user transmission may be required.

Accordingly, when the STA clustering is performed for every transmission time, overhead may increase and throughput performance may be degraded.

It can be seen that the transmission delay-based STA clustering through the simulation may improve channel utilization that is directly related to the network processing performance.

Further, it can be confirmed that a reverse clustering-based method needs to perform re-clustering according to a change in the uplink transmission environment.

The re-clustering may also improve fairness between the STAs compared to the transmission delay-based clustering method without re-clustering.

In terms of the proportional fair-based transmission scheduling, according to the present invention, a clustering-based proportional fair scheduler may be used.

In the method according to the present invention, the STA may be first clustered based on the transmission delay, and then the cluster may be scheduled so that uplink data is transmitted by the AP.

The STAs having similar transmission delays may be clustered together for improving channel utilization and network throughput performance in the uplink multi-user scenario.

In the IEEE 802.11ax network, a clustering scheduling method based on a proportional fair-based approach method may be used by using a high-efficient cluster for the uplink multi-user transmission scenario.

The proportional fair-based scheduling may improve fairness of the STA that attempts to transmit data and network throughput by adjusting a priority of the STA that is in inversely proportional to previous resource consumption.

Since the proportional fair-based method is capable of achieving excellent performance in both network throughput and fairness between the STAs, the proportional fair-based method may be one of the widely used scheduling access methods.

In the method according to the present invention, a higher transmission opportunity may be obtained as the STA is exhausted to transmit uplink data and the transmission delay is shortened.

The method according to the present invention may cluster the STA based on the transmission delay and then perform scheduling as represented in Equation 3.

In time slot t, a transmission speed of $STA_{si}$, $s_i \in S$ may be represented as $R^t_{si}(\gamma_{aS,si})$. In the present invention, in order to minimize the uplink multi-user transmission delay in the IEEE 802.11ax network, proportional fairness may be used based on the transmission delay.

The proportional fairness value according to the present invention of each cluster may be represented as Equation 4.

$$v^t_{C^{UL}_l} = \frac{\left\{\sum_{s_i \in C^{UL}_l} R^t_{s_i}(\gamma_{aS,s_i})^{-1}\right\}^\alpha}{\left\{\frac{1}{T}\sum_{k=t-T}^{t-1} \sum_{k_i \in C^{UL}_l} R^k_{s_i}(\gamma_{aS,s_i})^{-1}\right\}^\beta}$$ [Equation 4]

Herein, $v\,C\,_{UL}{}^t$ represents a proportional fairness value of cluster 1 ($C_1^{UL} \subset C^{UL}$) at time slot t. $\alpha$ and $\beta$ represent adjustment values for balancing the transmission delay and the fairness performance.

For example, in the case where $\alpha=1$ and $\beta=0$, the proportional fairness value may be a sum of transmission delays of the STAs in the cluster.

In the meantime, in the case where $\alpha=0$ and $\beta=1$, the cluster may be scheduled by a round-robin method. An average period T may be adjusted within a hardware limitation.

The method according to the present invention may calculate the proportional fairness values of all clusters within the $C^{UL}$ for every scheduling period, and schedule the cluster having a minimum value for the uplink data transmission. At time t, the cluster scheduling problem for the multi-user uplink transmission may be formulated as Equation 5.

$$\arg\min_{C_l^{UL} \in C^{UL}} v^t_{C_l^{UL}}$$ [Equation 5]

Equation 5 may be easily solved by comparing the proportional fairness values of the clusters in the $C^{UL}$. After the cluster having the minimum value is found, the STAs of the cluster may be scheduled for the simultaneous uplink multi-user transmission.

The scheduling method according to the present invention may efficiently improve uplink channel utilization and network processing performance by clustering the STAs having the similar transmission delays, and prevent channel access insufficiency of the STA by utilizing the proportional fairness.

In the exemplary embodiment, in terms of the re-clustering condition based on transmission delay, performance of the scheduling method according to the present invention may vary depending on the transmission delay difference of the STA. Accordingly, when the data size or the transmission rate for uplink transmission after the clustering is considerably changed, the channel utilization may be decreased and as a result, the performance of the method according to the present invention may be degraded.

The STA may need to be re-clustered when the transmission delay difference is larger than a specific threshold to compensate for performance degradation.

The re-clustering condition of the method according to the present invention may be based on the change in the transmission delay. The time at which the STA is clustered may be represented as t'.

A maximum transmission delay of each cluster at time t' may be calculated, and the transmission delay difference of the cluster having the largest value may be expressed as $\tau'_{max}$.

At time t, the cluster for performing the uplink multi-user data transmission is selected like Equation 5, and the cluster selected at time t may be represented as $C^{*UL,t}$.

the AP may compare the maximum transmission delay of the current selected cluster $C^{*UL,t}$ with $\tau'_{max}$ by transmitting a triggering frame before the scheduling information is notified to the STA.

The method according to the present invention may perform the re-clustering as represented in Equation 6.

$$\max\{\tau(d_{s_i}^t, d_{s_j}^t)\} > \lambda \cdot \tau'_{max}, \text{ for } s_i, s_j \in C_*^{UL,t} \quad \text{[Equation 6]}$$

Herein, $\lambda$ is a tunable parameter, and may be changed according to network topology or a channel environment.

In the method according to the present invention, the re-clustering is performed by comparing the current transmission delay difference with the initial clustering, thereby maintaining reasonable channel utilization for the uplink multi-user transmission without significant performance degradation.

A performance evaluation of the uplink multi-user scheduling may be performed. In the network topology consisting of the AP and multiple STAs, the multiple STAs may participate in the uplink multi-user transmission.

As illustrated in FIG. 1, the AP may receive a response of the STA by broadcasting the MU-RTS and receiving the CTS.

The uplink multi-user scheduling method according to the present invention may collect transmission information including a buffer state and a channel state by the AP, divided the STAs into multiple clusters, group the STAs having similar expected delays, and transmit uplink data.

The cluster may be selected according to a proportional fairness strategy or a round-robin scheme. In the method according to the present invention, the delay-based clustering using the round-robin selection method, the delay-based clustering using a random selection method, and a random selection method without clustering may be compared.

In the exemplary embodiment, Table 1 represents simulation parameter for an uplink transmission scenario in the IEEE 802.11ax network.

| Parameter | Value | Parameter | Value |
| --- | --- | --- | --- |
| SIFS | 16(μs) | Service field length | 16(bits) |
| AIFS | 34(μs) | MPDU delimiter length | 32(bits) |
| Legacy preamble | 20(μs) | MAC header length | 320(bits) |
| HE preamble | 168(μs) | Tail length | 18(bits) |
| Max APEP size | 4096(Bytes) | RTS | 160(bits) |
| Max Buffer size | 256000(bits) | CTS | 112(bits) |

An aggregated MAC protocol data unit (A-MPDU) pre-EOF padding (APEP) size of the STA disposed in the network may be randomly selected in the range of 0 to 4097 bytes, and the MCS may be set between 0 to 11 according to the channel state between each STA and the AP.

FIG. 4 is a graph representing network throughput performance in the case where the number of STAs is 200 according to the exemplary embodiment of the present invention.

Referring to FIG. 4, as can be seen in FIG. 4, when the number of simultaneous uplink transmission is increased, network processing performance may be improved.

It can be seen that for the case of all uplink having the different number of simultaneous transmission, the proposed delay-based clustering with proportional fair selection according to the present invention have better performance than that of other methods.

When α increases and β decreases, the cluster is selected to increase throughput performance, so that it can be seen that when α=0.8 and β=0.2 in the method according to the present invention has the highest throughput performance.

As α decreases and β increases, throughput performance of the method according to the present invention may be close to the round-robin-based cluster selection.

Further, according to the simulation result, it can be confirmed that the method with the delay-based clustering exhibits better performance than the method without clustering. This is because the transmission delay-based clustering increases channel utilization between the uplink data transmission of the STA and the block ACK transmission of the AP.

FIG. 5 is a graph representing fairness performance in the case where the number of STAs is 200 according to the exemplary embodiment of the present invention.

Referring to FIG. 5, the fairness performance of the number of simultaneous uplink transmission may be confirmed.

The fairness performance is measured based on the amount of data transmitted by a broadcasting station, and may be calculated by using Jain's fairness index. On the other hand, the delay-based clustering according to the present invention using the proportional fair selectin selects the cluster in order to maximize throughput performance, not fairness, so that fairness performance may be low.

However, as α decreases and β increases, fairness performance of the method according to the present invention may be increased through the proportional fair selection.

In the method according to the present invention, the fairness performance when α=0.5 and β=0.5 may be similar to fairness performance of the delay-based clustering method through the round-robin selection when the number of times of the simultaneous uplink transmission is six or more.

FIG. 6 is a graph representing network throughput performance in the case where the number of STAs is 100 according to the exemplary embodiment of the present invention.

Referring to FIG. 6, network throughput performance when 100 STAs are present in the network can be confirmed.

It can be confirmed that the throughput performance is similar to the result of FIG. 4. When the through performance result of FIG. 6 is compared with the through performance result of FIG. 4, a difference in throughput performance between the delay-based clustering according to the present invention using the proportional fair selection and the delay-based clustering using the round-robin selection may be decreased.

Particularly, when α=0.5 and β=0.5, the throughput performance difference may be further decreased. This may be because as the number of STAs decreases, the number of cluster candidates to be selected for the uplink transmission decreases.

However, when α=0.8 and β=0.2, it can be seen that the network processing performance of the method according to the present invention is considerably better than that of other methods.

FIG. 7 is a graph representing fairness performance in the case where the number of STAs is 100 according to the exemplary embodiment of the present invention.

Referring to FIG. 7, fairness performance when 100 STAs are present in the network can be confirmed.

Since the number of STAs is decreased compared to the uplink transmission scenario of FIG. 5, the number of clusters may decrease and the possibility of a fair cluster selection may increase.

Accordingly, when α=0.5 and β=0.5, and α=0.6 and α=0.4, fairness performance of the method according to the present invention may increase compared to the scenario of the highly disposed STAs. That is, in the scenario in which 200 STAs are present, the uplink data may be transmitted.

According to the simulation result, it can be confirmed that the delay-based clustering according to the present invention through the proportional fair selection improves network throughput performance of the multi-user uplink transmission scenario in the IEEE 802.11ax network Further, when the proportional fairness parameters α and β are adjusted, fairness performance may be improved.

FIG. 8 is a graph representing network throughput performance in the case where the MCSs of 80% of the STAs are changed and λ is 1.5 according to the exemplary embodiment of the present invention. FIG. 9 is a graph representing network throughput performance in the case where the MCSs of 40% of the STAs are changed and λ is 1.5 according to the exemplary embodiment of the present invention.

Referring to FIGS. 8 and 9, network throughput performance in the case where the uplink channel is unstable and each of the MCSs of 80% and % of the STAs is changed for every simulation time can be confirmed.

In the case of the method according to the present invention having the re-clustering strategy, when λ is set to 1.5 and the condition of Equation 6 is satisfied, the method may perform the re-clustering.

According to the simulation result, it can be confirmed that network throughput performance decreases as the channel is unstable. That is, more STAs may perform the MCS change due to the time-varying channels between the STAs and the AP.

For the same values of α and β, it can be confirmed that the re-clustering method according to the present invention exhibits better processing performance than that of the method according to the present invention without re-clustering. This may mean that the performance of re-clustering is important for improving network throughput performance in the channel environment varying over time.

Further, in the case of the uplink transmission scenario of FIG. 8, it can be confirmed that the re-clustering method (α=0.6 and β=0.4) according to the present invention exhibits the similar processing performance to that of the method (α=0.8 and β=0.2) according to the present invention without re-clustering.

FIG. 10 is a graph representing fairness performance in the case where the MCS of 80% the STAs are changed and λ is 1.5 according to the exemplary embodiment of the present invention. FIG. 11 is a graph representing fairness performance in the case where the MCSs of 40% of the STAs are changed and λ is 1.5 according to the exemplary embodiment of the present invention.

Referring to FIGS. 10 and 11, fairness performance of the method according to the present invention in an unstable channel environment may be confirmed. Similar to the result of the stable uplink scenario, when a decreases and β increases, fairness performance may increase.

On the other hand, according to the simulation result, the similar fairness performance regardless of the channel environment can be confirmed. By performing the STA re-clustering based on the transmission delay in the unstable channel environment, it is possible to increase throughput performance while maintaining fairness performance.

FIG. 12 is a graph representing network throughput performance in the case where the MCSs of 80% of the STAs are changed and λ is 1.9 according to the exemplary embodiment of the present invention. FIG. 13 is a graph representing network throughput performance in the case where the MCSs of 40% of the STAs are changed and λ is 1.9 according to the exemplary embodiment of the present invention.

Referring to FIGS. 12 and 13, network throughput performance in an unstable channel when the MCSs of 80% and 40% of the STAs are changed for each simulation time can be confirmed.

Unlike the performance evaluation of FIGS. 8 and 9, as represented in Equation 6, λ performing the re-clustering may be set to 1.9, not 1.5. As can be seen from the result, it can be seen that as the value of λ increases, the re-clustering method according to the present invention exhibits similar performance to that of the method according to the present invention without re-clustering.

Further, in FIG. 12, compared to the result of FIG. 13, the performance of the method according to the present invention through the re-clustering may be close to that of the method according to the present invention without re-clustering. This may mean that λ is the channel between the STAs and needs to be adjusted to a smaller value, and the AP becomes unstable.

FIG. 14 is a diagram illustrating a software-defined wireless device-based test bed according to the exemplary embodiment of the present invention.

Referring to FIG. 14, software-defined radio equipment-based experiments may be performed.

The method according to the present invention may be verified through the SDR equipment-based experiment as illustrated in FIG. 14.

One Universal Software Radio Peripheral (USRP) may be distributed to the AP, and four USRPs may be distributed to the STA desired to transmit the uplink data to the AP. A host computer may perform uplink scheduling of the STA, and the scheduled information may be transmitted to the STA through the Ethernet.

After that, the selected STA may perform the uplink transmission to the AP connected to the computer for analyzing the received data. The channel utilization of the simultaneous uplink transmission may be investigated by using the USRP-based test bed.

FIG. 15 is a graph representing channel utilization performance according to the exemplary embodiment of the present invention.

Referring to FIG. 5, an experiment result of the channel utilization in the simultaneous uplink scenario may be confirmed.

The optimum re-clustering scheme may check the highest channel utilization performance while performing re-clustering at every time slot.

As a result, it can be confirmed that the delay-based clustering using the re-clustering method has higher channel utilization performance than other methods, except for the method of performing re-clustering every time.

The method according to the present invention without re-clustering has low channel utilization performance than the method according to the present invention with re-clustering, but the performance thereof may be still higher than the round-robin selection or the random selection.

It is possible to verify efficiency of the uplink multi-user transmission method according to the present invention through the SDR-based test bed.

In the exemplary embodiment, the present invention may use the proportional fair-based uplink multi-user scheduling method.

In order to efficiently improve channel utilization, the method according to the present invention clusters the STA according to a transmission time and performs the proportion-based scheduling on the cluster to improve network throughput performance.

FIG. 16 is a diagram illustrating a method of multi-user scheduling for minimizing transmission delay according to an exemplary embodiment of the present invention. In the exemplary embodiment, each operation of FIG. 16 may be performed by the AP 110 of FIG. 1.

Referring to FIG. 16, operation S1601 is an operation of clustering at least one STA among the plurality of STAs 120-1 to 120-3 to a terminal cluster based on transmission delay for each of the plurality of STAs 120-1 to 120-3.

In the exemplary embodiment, before operation S1601, a multi-user request-to-send (MU-RTS) frame may be transmitted to the plurality of STAs 120-1 to 120-3, and in response to the transmission of the MU-RTS frame, a clear-to-send (CTS) frame may be received from each of the plurality of STAs 120-1 to 120-3.

In the exemplary embodiment, the transmission delay for each of the plurality of STAs 120-1 to 120-3 may be determined based on at least one of Channel State Information (CSI) and a Buffer Status Response (BSR) for each of the plurality of STAs 120-1 to 120-3.

In the exemplary embodiment, between operation S1601 and S1603, a proportional fair value representing a transmission priority of uplink data for at least one clustered STA may be determined, and scheduling information about the terminal cluster having the smallest proportional fair value may be determined.

In the exemplary embodiment, the proportional fair-based scheduling may determine scheduling information about at least one STA by adjusting a priority of the STA that is inversely proportional to previous resource consumption. That is, the scheduling may be performed so as to transmit the uplink data to at least one STA about which the scheduling information has been determined.

Operation S1603 is an operation of transmitting a trigger frame including the scheduling information about the terminal cluster including at least one STA to at least one STA.

Operation S1605 is an operation of receiving the uplink data from at least one STA in response to the transmission of the trigger frame.

In the exemplary embodiment, after operation S1601, at least one STA among the plurality of STAs 120-1 to 120-3 may be re-clustered based on a change in the transmission delay for each of the plurality of STAs 120-1 to 120-3.

In the exemplary embodiment, when a transmission delay difference for the plurality of STAs 120-1 to 120-3 is larger than a specific threshold, the plurality of STAs 120-1 to 120-3 may be re-clustered.

FIG. 17 is a diagram illustrating a multi-user scheduling apparatus 1700 for minimizing transmission delay according to an exemplary embodiment of the present invention. In the exemplary embodiment, the multi-user scheduling apparatus 1700 of FIG. 17 may include the AP 110 of FIG. 1.

Referring to FIG. 17, the multi-user scheduling apparatus 1700 may include a control unit 1710, a communication unit 1720, and a storage unit 1730.

The control unit 1710 may cluster at least one STA among the plurality of STAs 120-1 to 120-3 into a terminal cluster based on transmission delay for each of the plurality of STAs 120-1 to 120-3.

In the exemplary embodiment, the control unit 1710 may include at least one processor or micro-processor, or may be a part of a processor. Further, the control unit 1710 may be called a communication processor (CP). The control unit 1710 may control an operation of the multi-user scheduling apparatus 1700 according to various exemplary embodiments of the present invention.

The communication unit 1720 may transmit a trigger frame including scheduling information for the terminal cluster including at least one STA to at least one STA, and receive uplink data from at least one STA in response to the transmission of the trigger frame.

In the exemplary embodiment, the communication unit 1720 may include at least one of a wire communication module and a wireless communication module. The entirety or a part of the communication unit 1720 may be referred to as a "transmission unit", a "reception unit", or a "transceiver".

The storage unit 1730 may store terminal cluster information. In the exemplary embodiment, the storage unit 1730 may store the scheduling information.

In the exemplary embodiment, the storage unit 1730 may be formed of a volatile memory, a non-volatile memory, or a combination of a volatile memory and a non-volatile memory. Further, the storage unit 1730 may provide stored data according to a request of the control unit 1720.

Referring to FIG. 17, the multi-user scheduling apparatus 1700 may include a control unit 1710, a communication unit 1720, and a storage unit 1730. In various exemplary embodiments of the present invention, the configurations described in FIG. 17 are not essential in the multi-user scheduling apparatus 1700, so that the multi-user scheduling apparatus 1700 may be implemented with more or less configurations than the configurations described in FIG. 17.

The foregoing description is merely illustrative of the technical spirit of the present invention, and various changes and modifications may be made by those skilled in the art without departing from the essential characteristics of the present invention.

The various exemplary embodiments disclosed in the present specification may be performed out of order, and may be performed simultaneously or separately.

In the exemplary embodiment, in each drawing described in the present specification, at least one step may be omitted or added, and may be performed in the reverse order or may be performed simultaneously.

The exemplary embodiments disclosed in the present specification are not intended to limit the technical spirit of the present invention, and but to illustrate, and the scope of the present invention is not limited by these exemplary embodiments.

The scope of the present invention should be construed by the claims, and all technical spirits within the scope equivalent thereto should be understood to be included in the scope of the present invention.

What is claimed is:

1. A method of multi-user scheduling for minimizing transmission delay, comprising:
   (a) clustering a plurality of stations (STAs) to terminal clusters based on transmission delay for each of the plurality of STAs;
   (b) transmitting a trigger frame including scheduling information about the terminal clusters including said at least one STA to said at least one STA; and
   (c) receiving uplink data from said at least one STA in response to the transmission of the trigger frame,
   wherein the method further comprises:
   between the operation (a) and the operation (b),
   determining proportional fair values representing transmission priority of the uplink data for the terminal clusters; and
   selecting one among the terminal clusters having a smallest proportional fair value and scheduling transmission of the uplink data from STAs clustered in the selected one.

2. The method of claim 1, further comprising:
   before the operation (a),
   transmitting a multi-user request-to-send (MU-RTS) frame to the plurality of STAs; and
   receiving a clear-to-send (CTS) frame from each of the plurality of STAs in response to the transmission of the MU-RTS frame.

3. The method of claim 1, wherein the operation (a) includes determining the transmission delay for each of the plurality of STAs based on at least one of channel state information (CSI) and a buffer status response (BSR) for each of the plurality of STAs.

4. The method of claim 1, further comprising:
   after the operation (a),
   re-clustering at least one STA among the plurality of STAs based on a change in the transmission delay for each of the plurality of STAs.

5. An apparatus for multi-user scheduling for minimizing transmission delay, comprising:
   a control unit configured to cluster a plurality of stations (STAs) to terminal clusters based on transmission delay for each of the plurality of STAs; and
   a communication unit configured to transmit a trigger frame including scheduling information about the terminal clusters to the plurality of STAs, and receive uplink data from the plurality of the STAs,
   wherein the control unit is further configured to:
   determine proportional fair values representing transmission priority of the uplink data for the terminal clusters, and
   select one among the terminal clusters having a smallest proportional fair value and schedule transmission of the uplink data from STAs clustered in the selected one.

6. The apparatus of claim 5, wherein the communication unit transmits a multi-user request-to-send (MU-RTS) frame to the plurality of STAs, and receives a clear-to-send (CTS) from each of the plurality of STAs in response to the transmission of the MU-RTS frame.

7. The apparatus of claim 5, wherein the control unit determines the transmission delay for each of the plurality of STAs based on at least one of channel state information (CSI) and a buffer status response (BSR) for each of the plurality of STAs.

8. The apparatus of claim 5, wherein the control unit re-clusters at least one STA among the plurality of STAs based on a change in the transmission delay for each of the plurality of STAs.

* * * * *